United States Patent Office 2,768,055
Patented Oct. 23, 1956

2,768,055

COMPOSITION FOR AFTERTREATMENT OF DYEINGS

Clemens Streck, Loudonville, Lester N. Stanley, Brookview, and Alois C. Baggenstoss, Delmar, N. Y., assignors to General Aniline & Film Corporation, New York, N. Y., a corporation of Delaware No Drawing. Application November 15, 1952, Serial No. 320,811

11 Claims. (Cl. 8—74)

The present invention relates to a process for aftertreating dyeings and prints on fibrous material and to the composition employed therefor.

It is known that the wet fastness of dyeings and prints which have been prepared with the help of water soluble dyestuffs may be increased by aftertreatment with aldehyde condensation products. However, said known aftertreatments have most often not been entirely satisfactory. In many instances, the light fastness properties of the aftertreated dyeings and prints are adversely affected. The compositions employed for the aftertreatment have frequently had undesirable properties with respect to solubility, stability and the like. In some cases the shade of the treated dyeing is affected. Various other objections are known to have been encountered.

It is an object of this invention to provide a method and composition minimizing the above-mentioned disadvantages and operative to increase the wet fastness and light fastness properties of dyeings and prints on fibrous materials. Other objects and advantages will appear as the description proceeds.

This invention is based upon the discovery that a composition comprising a water soluble copper salt, an alkaline acting or amphoteric buffering agent and an acidic condensation product of formaldehyde, dicyandiamide and an easily ionizable ammonium salt, when dissolved in an aqueous medium is effective for aftertreating dyeings and prints on fibrous material to improve the wet fastness and light fastness properties thereof.

The acidic condensation product operative in the instant invention is prepared by condensation of about 1.5 to 2.5 moles of formaldehyde and about 0.5 to 1 mole of the ammonium salt per mole of dicyandiamide. The preferred condensation product is one which has been produced by condensing the ammonium salt, formaldehyde and dicyandiamide in molar proportions of, respectively, 0.5:1.5–2.0:1.0. The condensation reaction is exothermic in nature whereby the temperature, initially at room temperature, gradually rises and is maintained at about 80 to 100° C. until the desired condensation product is obtained. Temperatures much above 100° C. are undesirable because formaldehyde and water are boiled off. Therefore, heating or cooling may be necessary to maintain the temperature within the aforementioned range. While about 4 hours are usually sufficient to produce the desired acidic condensation product, the reaction time may in general range from about ½ to 8 hours depending on the conditions of reaction, proportions of reactants, condensation product desired, etc. The pH of the reaction is on the acid side and may range from about 5.0 to 6.8, preferably at about 6.5. While generally unnecessary, acid substances may be added to the reaction mixture to adjust the pH to the desired value.

The condensation product thus produced is acidic in nature in that its solution in water has an acid pH, which ranges from about 5.5–6.8. It will therefore be understood that the term "acidic condensation product" employed herein and in the appended claims refers to the condensation product having acidic properties as defined above. Said product is soluble, in the form of its hydrochloride, in dilute aqueous acid media but precipitates when the medium is rendered neutral or alkaline. The nature of the condensation reaction is not definitely known, but it is believed that during the condensation reaction the ammonium salt ionizes to liberate ammonium ion and acid anion, the latter assisting in rendering the medium acidic and the former taking part in the condensation reaction and forming an integral part of the condensation product. Regardless of the mechanism involved, it has been proven that the ammonium ion reacts and forms an integral part of the condensation product.

While ammonium chloride is preferred, any other water-soluble, easily ionizable ammonium salt may be used in the reaction, such as the ammonium salt of a strong acid such as ammonium bromide, phosphate, thiocyanate, sulfate and the like, or of a weak acid such as ammonium acetate and the like. An ammonium salt of a strong acid is preferred, especially one which does not cause precipitation of any of the components of the instant inventive composition or of the condensation product when dissolved in water. However, should such precipitation of the condensation product occur, it can be solubilized by treatment with a strong acid such as hydrochloric acid which will yield a soluble salt of said product.

The copper salt operative in the instant invention must be a water soluble salt that does not precipitate under the conditions of usage and may, for example, be copper acetate, copper chloride, copper ammonium chloride, or the like.

The alkaline acting or amphoteric buffering agent operative in the instant invention is necessary to stabilize the pH-sensitive composition and prevent precipitaton of copper hydroxde and the like. While sodium or potassium acetate are preferred, other suitable agents include ammonium acetate, lithium acetate, sodium formate and sodium borate. In general, they include the acetates, formates and borates of ammonium and the alkalimetals.

The components of the inventive composition herein may be employed in weight proportions of about 10 to 100 parts of copper salt and 10 to 50 parts of buffering agent for each 100 parts of condensation product, the preferred proportions being, respectively, 50:50:100. The composition is readily soluble in aqueous media to provide a solution suitable for aftertreating dyeings and prints in accordance with this invention. Since the composition of this invention is substantive in nature, the treatment of dyeings and prints proceeds by an exhaustion process. Accordingly, it will be readily understood that if enough time is allowed for exhaustion, the amount of composition to be dissolved in the aftertreating medium will depend upon the amount of fibrous material to be treated and the proportionate amount of dye on the fiber.

It will also be understood that variable factors in the aftertreatment such as concentration, duration, temperature of treatment, fiber-liquor ratios and the like, will in any particular instance be interrelated and dependent upon the function and results desired. Control of these variables will be obvious to a worker skilled in the art. In general, the aftertreatment of dyeings and prints is carried out at about 140 to 160° F. but can be raised or lowered as conditions require. Similarly, while 20 to 30 minutes are usually sufficient, the duration of aftertreatment may depart from this range depending on other factors. The usual concentration is about 2% of the composition based on the weight of the fiber, but may vary therefrom depending on the amount of dye on the fiber, depth of shade desired (less for pastels, more for heavy shades) and the like. The pH is generally that of the aqueous solution of the instant composition, namely, between about 5.5 and 6.8, preferably about 6.5. The treated fibrous material is dried in the usual manner, no curing being necessary.

The dyeings and prints to be aftertreated in accordance with this invention may be made with any water soluble substantive dyestuff. The instant invention is particularly advantageous for aftertreating dyeings and prints made with water-soluble, direct azo dyestuffs containing o-hydroxy and o,o'-hydroxy groups relative to the azo linkage and groups in these positions capable of being readily converted to hydroxy groups, and a salicylic acid radical.

The following dyestuffs are given for illustrative purposes only:

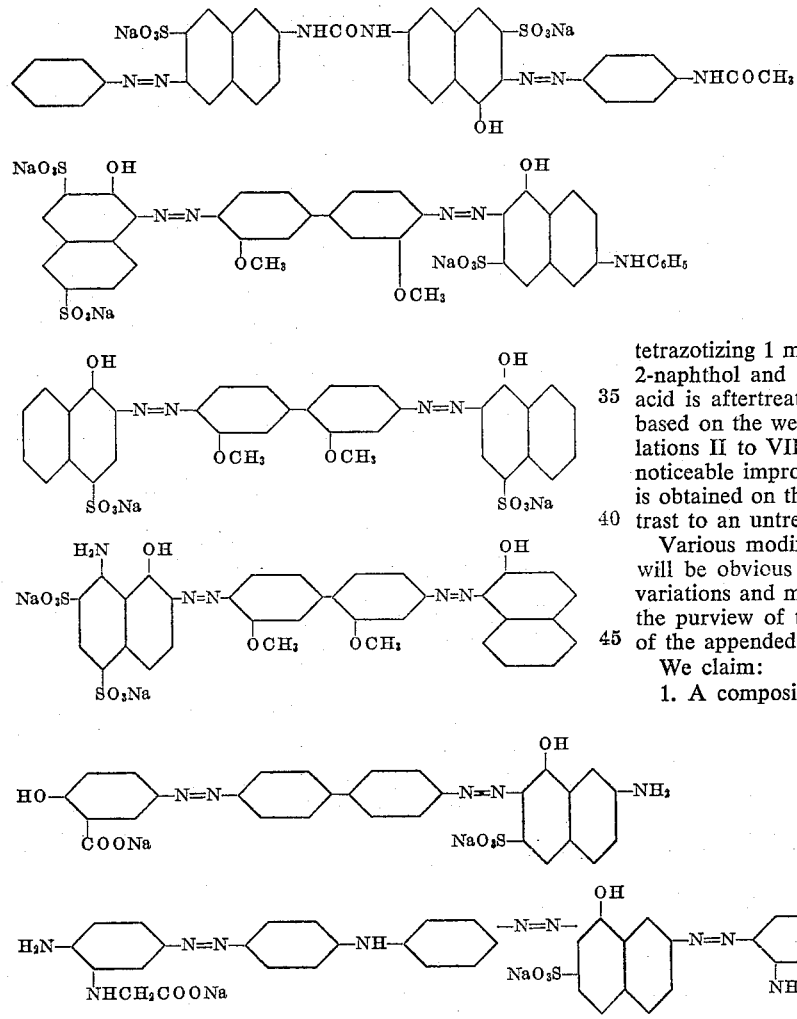

The fibrous material containing such dyestuffs may have a basis of cellulosic materials such as cotton, linen, rayon and the like, animal fibers such as wool, silk and the like, synthetic polymeric material and other fibers in any form or shape.

The following examples illustrate the invention but are not to be regarded as limitative, parts being by weight unless otherwise indicated.

*Example I*

84 g. dicyandiamide are charged into 54 cc. formaldehyde (100%) as a 38% solution. 30 g. ammonium chloride are added and the pH measured at about 6.5. The temperature gradually rises to about 80° C. It is heated at about 95–98° for about 4 hours. The resulting solution is run into salt solution, the precipitate filtered and dried. The final pH of the condensation product, on solution in water, is about 5.5.

The following compositions were formulated by mixing the components in a mixer.

|  | Examples | | | | | |
| --- | --- | --- | --- | --- | --- | --- |
|  | II | III | IV | V | VI | VII |
| Product of Example I | 50 | 50 | 50 | 50 | 40 | 60 |
| Copper acetate | 25 |  |  | 25 | 40 | 10 |
| Copper chloride |  | 25 |  |  |  |  |
| Copper ammonium chloride |  |  | 25 |  |  |  |
| Sodium acetate | 25 | 25 | 25 |  |  |  |
| Potassium acetate |  |  |  | 25 | 20 | 30 |

*Example VIII*

A 2% dyeing on cotton of the dye produced by tetrazotizing 1 mole dianisidine and coupling with .5 mol 2-naphthol and .5 mol 1-amino-8-naphthol-2,4-disulfonic acid is aftertreated for 30 minutes at 160° F. with 2% based on the weight of the material of the above formulations II to VII. The material is rinsed and dried. A noticeable improvement in wet-fastness and light-fastness is obtained on the dyeings treated in this manner in contrast to an untreated control.

Various modifications and variations of this invention will be obvious to a person skilled in the art and such variations and modifications are to be regarded as within the purview of this application and the spirit and scope of the appended claims.

We claim:

1. A composition for aftertreating dyeings and prints comprising about 10 to 100 parts by weight of a water-soluble, non-complex copper salt selected from the group consisting of copper acetate, copper chloride and copper ammonium chloride, about 10 to 50 parts by weight of an alkali metal acetate buffering agent, and about 100 parts by weight of an acidic condensation product of about 1.5 to 2.5 moles of formaldehyde, about 1 mole of dicyandiamide and about 0.5 to 1 mole of a water-soluble, easily ionizable ammonium salt.

2. The composition of claim 1 in which said ammonium salt is ammonium chloride.

3. The composition of claim 2 in which the copper salt is copper acetate.

4. The composition of claim 3 in which the buffering agent is sodium acetate.

5. The composition of claim 3 in which the buffering agent is potassium acetate.

6. The composition of claim 1 in which the copper salt is copper acetate.

7. The composition of claim 6 in which the buffering agent is sodium acetate.

8. The composition of claim 6 in which the buffering agent is potassium acetate.

9. A composition for aftertreating dyeings and prints comprising about 50 parts by weight of a water-soluble non-complex copper salt selected from the group consisting of copper acetate, copper chloride and copper ammonium chloride, about 50 parts by weight of an alkali metal acetate, and about 100 parts by weight of an acidic condensation product of about 1.5 to 2.0 moles of formaldehyde, about 1 mole of dicyandiamide and about 0.5 moles of ammonium chloride.

10. A composition for aftertreating dyeings and prints comprising about 100 parts by weight of copper acetate, about 50 parts by weight of an alkali metal acetate, and about 100 parts by weight of an acidic condensation product of about 1.5 to 2.0 moles of formaldehyde, about 1 mole of dicyandiamide and about 0.5 moles of ammonium chloride.

11. A composition for aftertreating dyeings and prints comprising about 17 parts by weight of copper acetate, about 50 parts by weight of an alkali metal acetate, and about 100 parts by weight of an acidic condensation product of about 1.5 to 2.0 moles of formaldehyde, about 1 mole of dicyandiamide and about 0.5 moles of ammonium chloride.

References Cited in the file of this patent

UNITED STATES PATENTS

| | | |
|---|---|---|
| 2,214,067 | Petersen | Sept. 10, 1940 |
| 2,364,726 | Landolt | Dec. 12, 1944 |
| 2,440,988 | Treboux | May 4, 1948 |
| 2,526,106 | Albrecht | Oct. 17, 1950 |
| 2,593,911 | Neumann | Apr. 27, 1952 |
| 2,631,920 | Albrecht | Mar. 17, 1953 |

FOREIGN PATENTS

| | | |
|---|---|---|
| 619,969 | Great Britain | Mar. 17, 1949 |
| 462,020 | Italy | Feb. 23, 1951 |